United States Patent
Kim et al.

(10) Patent No.: US 12,225,464 B2
(45) Date of Patent: Feb. 11, 2025

(54) USER COMMUNICATION DEVICE EXECUTING STANDBY MODE, OPERATING METHOD THEREOF, AND HUMAN BODY COMMUNICATION SYSTEM INCLUDING THE SAME

(71) Applicant: ELECTRONICS AND TELECOMMUNICATIONS RESEARCH INSTITUTE, Daejeon (KR)

(72) Inventors: Hyuk Kim, Daejeon (KR); Hyung-Il Park, Daejeon (KR); Tae Wook Kang, Daejeon (KR); Sung Eun Kim, Daejeon (KR); Mi Jeong Park, Daejeon (KR); Kyung Jin Byun, Daejeon (KR); Kwang Il Oh, Daejeon (KR); Sukho Lee, Daejeon (KR); Jae-Jin Lee, Daejeon (KR); In Gi Lim, Daejeon (KR); Kyuseung Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 463 days.

(21) Appl. No.: 17/552,766

(22) Filed: Dec. 16, 2021

(65) Prior Publication Data

US 2022/0201611 A1    Jun. 23, 2022

(30) Foreign Application Priority Data

Dec. 17, 2020   (KR) ........................ 10-2020-0177679
Dec. 8, 2021    (KR) ........................ 10-2021-0174700

(51) Int. Cl.
*H04W 52/02* (2009.01)
*H04B 13/00* (2006.01)

(52) U.S. Cl.
CPC ...... *H04W 52/0229* (2013.01); *H04B 13/005* (2013.01)

(58) Field of Classification Search
CPC .................................................. H04W 52/0229
See application file for complete search history.

(56) References Cited

U.S. PATENT DOCUMENTS 8,843,071 B2    9/2014 Hwang
2009/0267735 A1   10/2009 Kim
(Continued)

FOREIGN PATENT DOCUMENTS

KR       20090113524 A     11/2009
KR       20130027965 A      3/2013
(Continued)

*Primary Examiner* — Hsinchun Liao
(74) *Attorney, Agent, or Firm* — Rabin & Berdo, P.C.

(57) ABSTRACT

Disclosed is an operating method of a user communication device, which includes receiving a wakeup signal from a stationary communication device over a first human body communication channel, the wakeup signal having a frequency in a low frequency band, switching from a standby mode to a wakeup mode in response to the wakeup signal, and receiving a data signal from the stationary communication device over the first human body communication channel during the wakeup mode, and the first human body communication channel is provided by a body of a user of the user communication device.

14 Claims, 8 Drawing Sheets

(56) References Cited

U.S. PATENT DOCUMENTS

| | | |
|---|---|---|
| 2010/0246643 A1 | 9/2010 | Lim et al. |
| 2010/0322290 A1 | 12/2010 | Kang et al. |
| 2010/0322294 A1 | 12/2010 | Park et al. |
| 2011/0299512 A1* | 12/2011 | Fukuda ................ G06F 1/3203 455/41.1 |
| 2017/0013556 A1 | 1/2017 | Tanaka et al. |

FOREIGN PATENT DOCUMENTS

| | | |
|---|---|---|
| KR | 101978232 B1 | 5/2019 |
| WO | 2015180937 A1 | 12/2015 |

\* cited by examiner

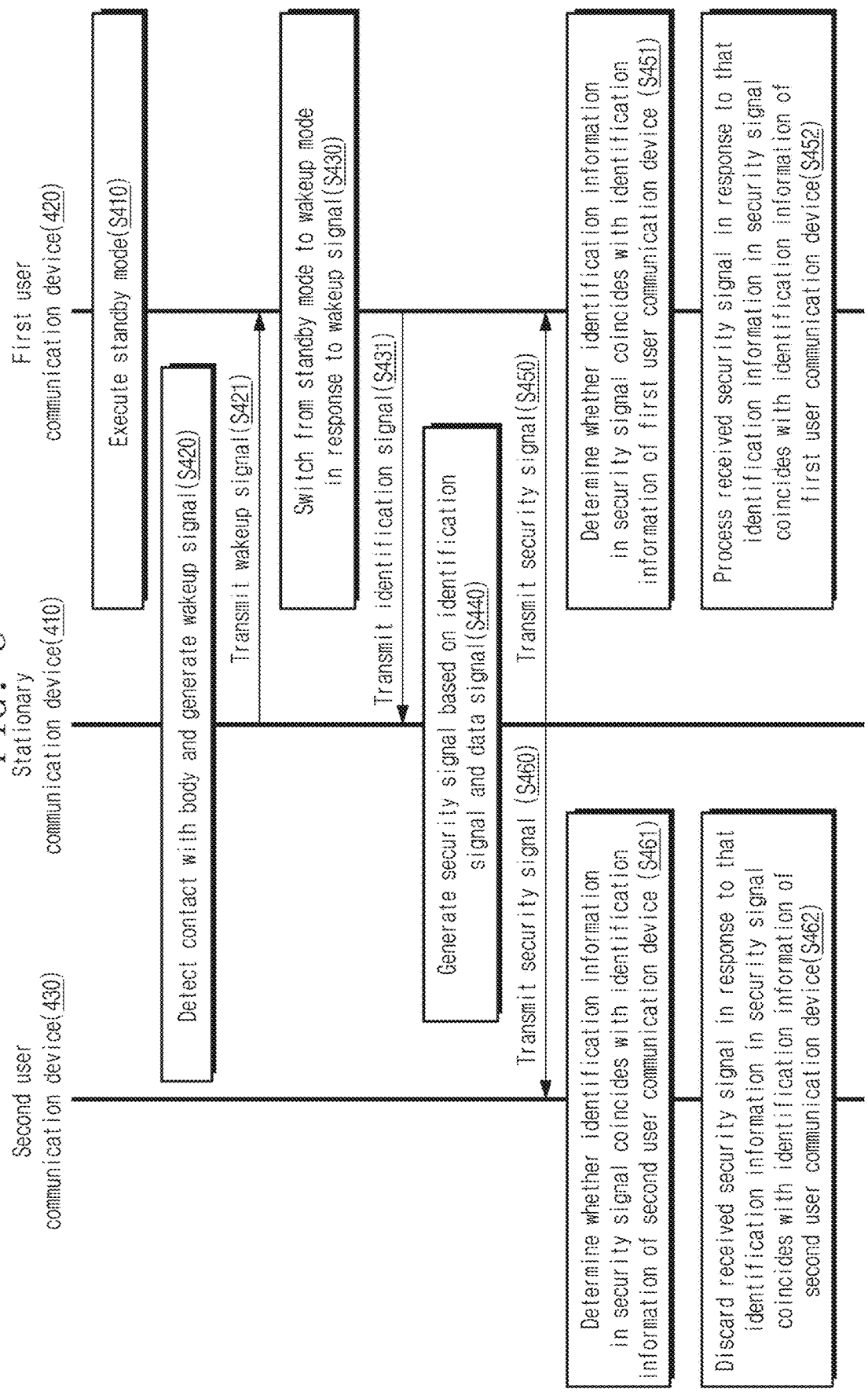

USER COMMUNICATION DEVICE EXECUTING STANDBY MODE, OPERATING METHOD THEREOF, AND HUMAN BODY COMMUNICATION SYSTEM INCLUDING THE SAME

CROSS-REFERENCE TO RELATED APPLICATIONS

This application claims priority under 35 U.S.C. § 119 to Korean Patent Application No. 10-2020-0177679 filed on Dec. 17, 2020, and 10-2021-0174700, filed on Dec. 8, 2021, respectively, in the Korean Intellectual Property Office, the disclosures of which are incorporated by reference herein in their entireties.

BACKGROUND

Embodiments of the present disclosure described herein relate to a human body communication device, and more particularly, relate to a user communication device executing a standby mode, an operating method thereof, and a human body communication system including the same.

Human body communication is a technology for transmitting data by using the human body as a communication channel, and various devices close to the human body may transmit and receive data through the human body. When a stationary communication device attached to a thing and a mobile communication device of the user transmit and receive data through the human body communication, there is a situation in which mobile communication devices of other users being near or in contact with the user receive data from the stationary communication device.

As such, to prevent unintended data from being received, there is a need for a method of controlling the interference between human body communication devices, which may occur when data are transmitted and received through a human body communication channel.

SUMMARY

Embodiments of the present disclosure provide a user communication device executing a standby mode, an operating method thereof, and a human body communication system including the same.

According to an embodiment, an operating method of a user communication device includes receiving a wakeup signal from a stationary communication device over a first human body communication channel, the wakeup signal having a frequency in a low frequency band, switching from a standby mode to a wakeup mode in response to the wakeup signal, and receiving a data signal from the stationary communication device over the first human body communication channel during the wakeup mode, and the first human body communication channel is provided by a body of a user of the user communication device.

In an embodiment, the receiving of the data signal from the stationary communication device over the first human body communication channel during the wakeup mode includes transmitting, at the user communication device, a notification signal to the stationary communication device indicating that the user communication device switches to the wakeup mode, during the wakeup mode, and receiving the data signal from the stationary communication device over the first human body communication channel after transmitting the notification signal.

In an embodiment, the method further includes transmitting a standby signal requesting another user communication device to set an operating mode of the another user communication device to the standby mode, during the wakeup mode.

In an embodiment, the transmitting of the standby signal indicating the standby mode to the another user communication device during the wakeup mode includes transmitting the standby signal to the another user communication device over a second human body communication channel during the wakeup mode, and the second human body communication channel is provided by a body of another user of the another user communication device.

In an embodiment, the transmitting of the standby signal indicating the standby mode to the another user communication device during the wakeup mode includes transmitting the standby signal to the another user communication device over a wireless communication channel during the wakeup mode.

In an embodiment, the user communication device and the another user communication device are mobile human body communication devices, and the stationary communication device is a stationary human body communication device.

In an embodiment, the method further includes switching from the wakeup mode to the standby mode after processing the data signal.

In an embodiment, the data signal has a frequency in a high frequency band higher than the low frequency band.

In an embodiment, the wakeup mode enables both communication for the low frequency band corresponding to the wakeup signal and communication for a high frequency band corresponding to the data signal.

According to an embodiment, an operating method of a human body communication system which includes a user communication device and a stationary communication device communicating with each other over a first human body communication channel includes transmitting, by the stationary communication device, a wakeup signal to the user communication device over the first human body communication channel, wherein the wakeup signal has a frequency in a low frequency band, switching, by the user communication device, from a standby mode to a wakeup mode in response to the wakeup signal, and transmitting, by the stationary communication device, a data signal to the user communication device over the first human body communication channel during the wakeup mode of the user communication device, and the first human body communication channel is provided by a body of a user of the user communication device.

In an embodiment, the human body communication system further includes another user communication device, the method further includes transmitting, by the user communication device, a standby signal to the stationary communication device over the first human body communication channel during the wakeup mode, and transmitting, by the stationary communication device, the standby signal to the another user communication device over a second human body communication channel in response to the standby signal, and the second human body communication channel is provided by a body of another user of the another user communication device.

In an embodiment, the method further includes executing, by the another user communication device, the standby mode in response to the standby signal.

In an embodiment, the switching from the standby mode to the wakeup mode in response to the wakeup signal by the user communication device includes transmitting, by the user communication device, an identification signal corresponding to identification information of the user communication device to the stationary communication device, and the transmitting of the data signal to the user communication device over the first human body communication channel during the wakeup mode of the user communication device by the stationary communication device includes generating, by the stationary communication device, a security signal including the identification information and data corresponding to the data signal, and transmitting, by the stationary communication device, the security signal to the user communication device over the first human body communication channel.

In an embodiment, the method further includes determining, by the user communication device, whether identification information of the security signal coincides with the identification information of the user communication device, and processing, by the user communication device, the security signal, when it is determined that the identification information of the security signal coincides with the identification information of the user communication device.

In an embodiment, the human body communication system further includes another user communication device, the transmitting of the security signal to the user communication device over the first human body communication channel by the stationary communication device includes transmitting, by the stationary communication device, the security signal to the another user communication device over a second human body communication channel, determining, by the another user communication device, whether identification information of the security signal coincides with the identification information of the another user communication device, and discarding the security signal based on the determination that the identification information of the security signal does not coincide with the identification information of the another user communication device, and the second human body communication channel is provided by a body of another user of the another user communication device.

In an embodiment, the transmitting of the identification signal to the stationary communication device by the user communication device includes transmitting, by the user communication device, the identification signal to the stationary communication device over the first human body communication channel or a wireless communication channel.

According to an embodiment, a user communication device includes a first electrode and a second electrode that contact a user, a receiver that receives a wakeup signal from a stationary communication device over a human body communication channel, based on that the first electrode contacts the user, a processor that switches an operating mode from a standby mode to a wakeup mode based on the wakeup signal and generates a standby signal indicating the standby mode, and a transmitter that transmits the standby signal to the stationary communication device over the human body communication channel, based on that the second electrode contacts the user, the processor enables communication for a low frequency band during the standby mode and enables the communication for the low frequency band and communication for a high frequency band during the wakeup mode, and the human body communication channel is provided by a body of the user.

BRIEF DESCRIPTION OF THE FIGURES

The above and other objects and features of the present disclosure will become apparent by describing in detail embodiments thereof with reference to the accompanying drawings.

FIG. 8 is a flowchart describing an operating method of a human body communication system of FIG. 7 according to an embodiment of the present disclosure.

DETAILED DESCRIPTION

Below, embodiments of the present disclosure may be described in detail and clearly to such an extent that an ordinary one in the art easily implements the invention.

In the following drawings or in the detailed description, modules may be connected with any other components except for components illustrated in a drawing or described in the detailed description. Modules or components may be connected directly or indirectly. Modules or components may be connected through communication or may be physically connected.

Figure 1:
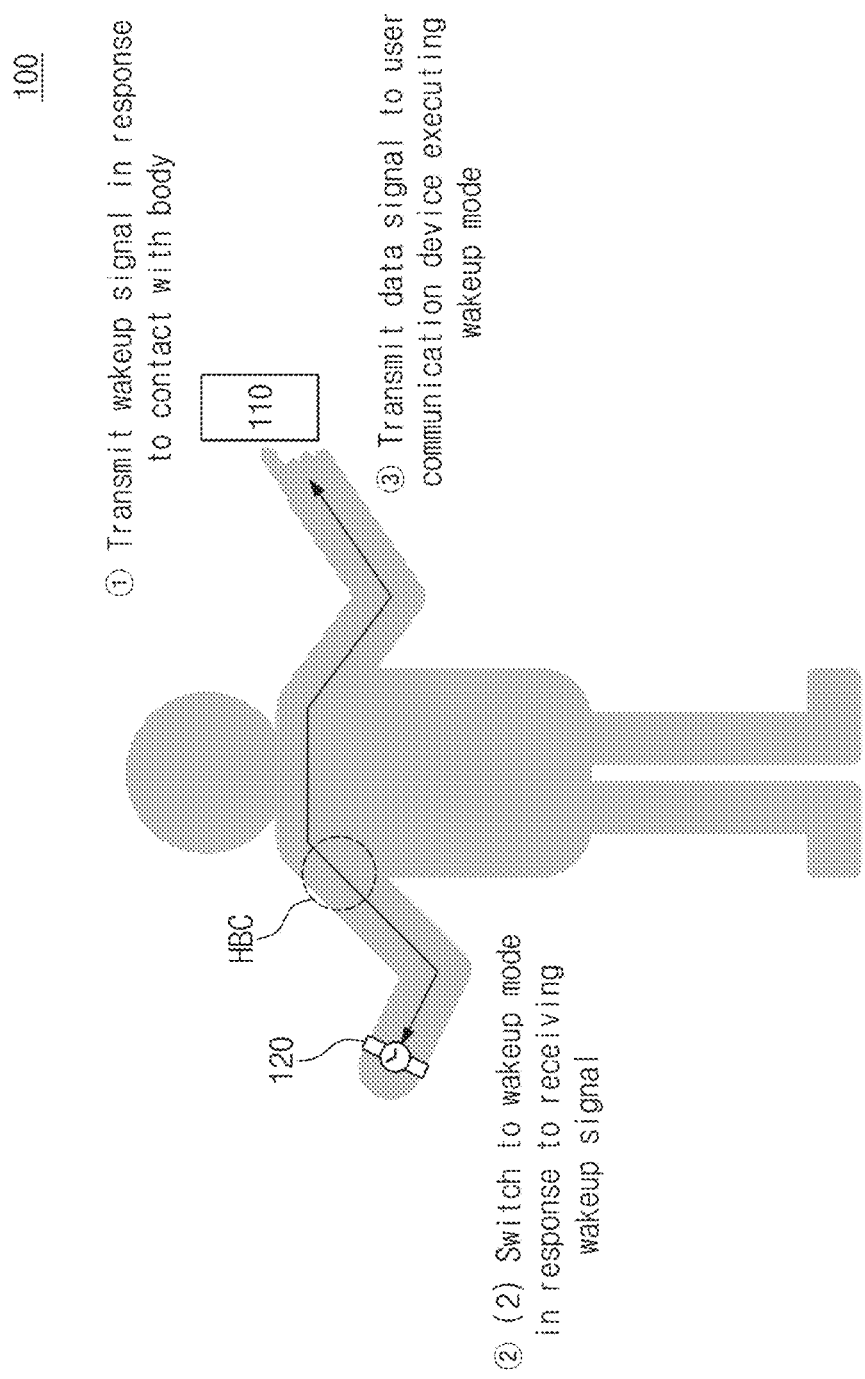
FIG. 1 is a block diagram illustrating a human body communication system according to an embodiment of the present disclosure.

FIG. 1 is a block diagram illustrating a human body communication system according to an embodiment of the present disclosure. Referring to FIG. 1, a human body communication system 100 may include a stationary communication device 110 and a user communication device 120. The stationary communication device 110 and the user communication device 120 may communicate over a human body communication channel HBC. The human body communication channel HBC may be provided by the user of the user communication device 120.

The stationary communication device 110 may communicate with the user communication device 120 over the human body communication channel HBC. The stationary communication device 110 may be a stationary human body communication device that intends to transmit and receive data with the user communication device 120 through a contact with the user. For example, the stationary communication device 110 may be a human body communication device attached to a home appliance such as a refrigerator, an air conditioner, or a washing machine. Also, the stationary communication device 110 may be used in an opening and closing device of a building or a device requiring personal authentication.

The user communication device 120 may communicate with the stationary communication device 110 over the human body communication channel HBC. The user communication device 120 may be a mobile human body communication device that intends to transmit and receive data with the stationary communication device 110 through a contact with the user. For example, the user communication device 120 may be a portable terminal such as a smartphone, a smart watch, a wearable device, a personal digital assistant (PDA), or a radio.

The stationary communication device 110 may transmit a wakeup signal to the user communication device 120 in response to that the contact with the user of the user communication device 120 is made. The wakeup signal may be a signal generated based on the contact with a body of the user. The wakeup signal may be a signal requesting to switch an operating mode of the user communication device 120 from a standby mode to a wakeup mode.

In an embodiment, the wakeup signal may be a signal having a frequency in a low frequency band. The standby mode may be a mode in which the user communication device 120 enables only communication for the low frequency band corresponding to the wakeup signal. The wakeup mode may be a mode in which the user communication device 120 enables communication for the low frequency band and communication for a low frequency band.

In response to the wakeup signal from the stationary communication device 110, the user communication device 120 may switch the operating mode of the user communication device 120 from the standby mode to the wakeup mode. That is, the user communication device 120 may execute the standby mode before receiving the wakeup signal; when the wakeup signal is received, the user communication device 120 may terminate the running standby mode and may execute the wakeup mode.

The stationary communication device 110 may transmit the wakeup signal to the user communication device 120 and may then transmit a data signal to the user communication device 120. The data signal may be a signal including data that the user intends to receive through the human body communication between the stationary communication device 110 and the user communication device 120. In an embodiment, the data signal may be a signal having a frequency in the high frequency band.

In an embodiment, after switched from the standby mode to the wakeup mode, the user communication device 120 may transmit a notification signal that notifies the stationary communication device 110 that the operating mode is switched to the wakeup mode. After receiving the notification signal, the stationary communication device 110 may transmit the data signal to the user communication device 120.

The human body communication channel HBC may be a channel that is utilized for the human body communication between the stationary communication device 110 and the user communication device 120. For example, the human body communication channel HBC may be a channel in which a part of the body of the user of the user communication device 120 is used as a medium.

Figure 2:
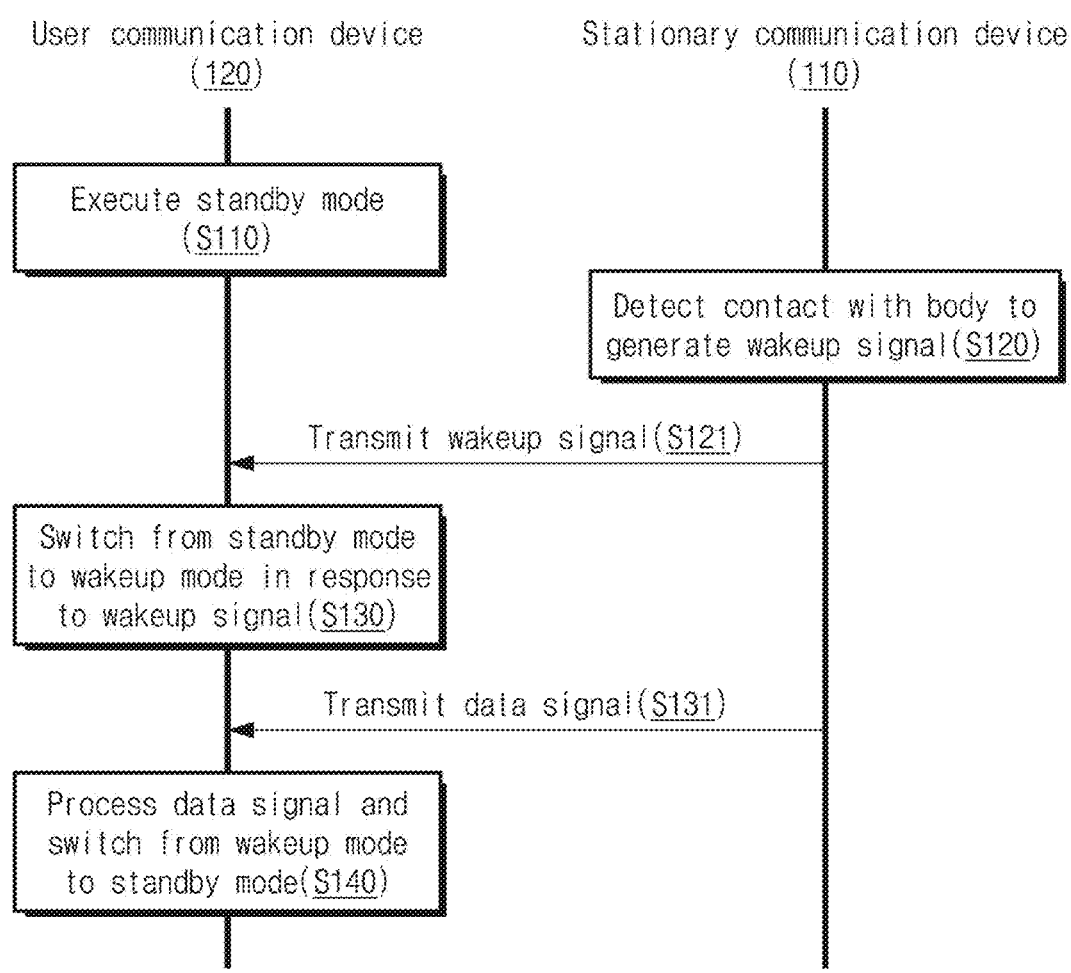
FIG. 2 is a flowchart describing an operating method of a human body communication system of FIG. 1 according to an embodiment of the present disclosure.

FIG. 2 is a flowchart describing an operating method of a human body communication system of FIG. 1 according to an embodiment of the present disclosure. An operating method of the human body communication system 100 of FIG. 1 is illustrated in FIG. 2. The stationary communication device 110 and the user communication device 120 may correspond to the stationary communication device 110 and the user communication device 120 of FIG. 1, respectively.

In operation S110, the user communication device 120 may execute the standby mode. While the user communication device 120 executes the standby mode, the user communication device 120 may receive only a signal having a frequency in the low frequency band.

In operation S120, the stationary communication device 110 may detect the contact with a body of the user of the user communication device 120 and may generate the wakeup signal. In operation S121, the stationary communication device 110 may transmit the wakeup signal to the user communication device 120.

In operation S130, the user communication device 120 may execute the wakeup mode in response to the wakeup signal. While executing the wakeup mode, the user communication device 120 may receive both a signal having a frequency in the low frequency band and a signal having a frequency in the high frequency band.

In an embodiment, operation S130 may include transmitting, at the user communication device 120, the notification signal requesting the data signal from the stationary communication device 110 in response to the wakeup signal. The notification signal may be a signal providing notification that the user communication device 120 switches to the wakeup mode.

In operation S131, the stationary communication device 110 may transmit the data signal to the user communication device 120. In an embodiment, operation S131 may include transmitting, at the stationary communication device 110, the data signal to the user communication device 120 after receiving the notification signal requesting the data signal from the user communication device 120.

In operation S140, the user communication device 120 may process the received data signal. After processing the data signal, the user communication device 120 may switch the operating mode of the user communication device 120 from the wakeup mode to the standby mode.

Figure 3:
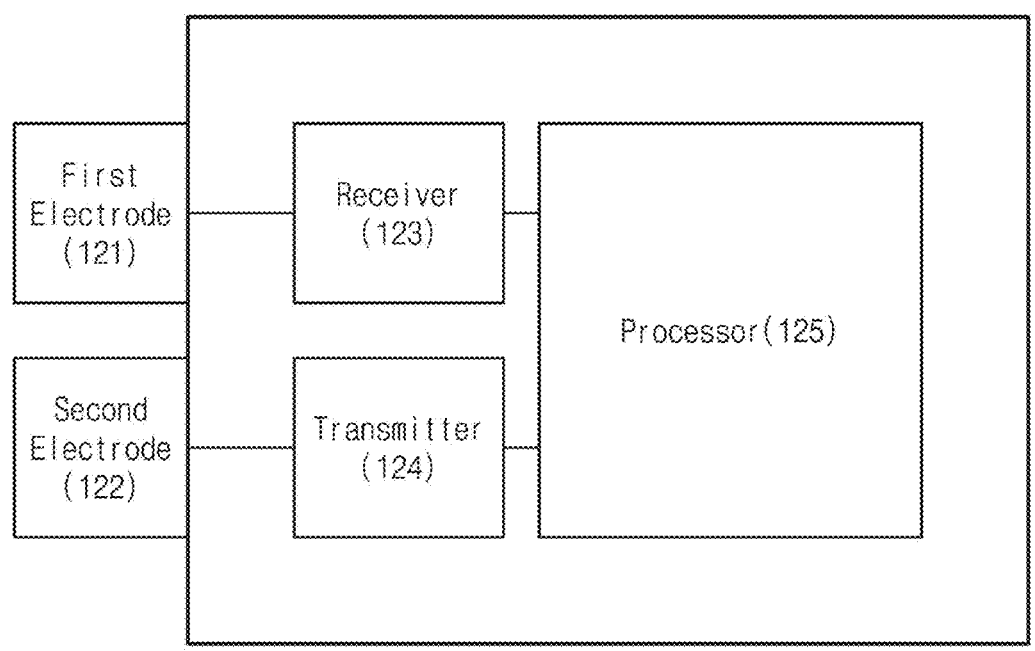
FIG. 3 is a block diagram illustrating a user communication device of FIG. 1 in detail, according to an embodiment of the present disclosure.

FIG. 3 is a block diagram illustrating a user communication device of FIG. 1 in detail, according to an embodiment of the present disclosure. Referring to FIG. 3, the user communication device 120 may include a first electrode 121, a second electrode 122, a receiver 123, a transmitter 124, and a processor 125. The user communication device 120 may correspond to the user communication device 120 of FIG. 1.

The first electrode 121 may be exposed to the outside of the user communication device 120 so as to be in contact with the user. The first electrode 121 may be an electrode that enables the human body communication of the user communication device 120. For example, the first electrode 121 may be an electrode that is used when the user communication device 120 receives data.

The second electrode 122 may be exposed to the outside of the user communication device 120 so as to be in contact with the user. The second electrode 122 may be an electrode that enables the human body communication of the user communication device 120. For example, the second electrode 122 may be an electrode that is used when the user communication device 120 transmits data.

Based on that the first electrode 121 is in contact with the user, the receiver 123 may receive the wakeup signal and the data signal from a stationary communication device over a human body communication channel. The receiver 123 may provide the wakeup signal and the data signal.

Based on that the second electrode 122 is in contact with the user, the transmitter 124 may transmit the notification signal to the stationary communication device over the human body communication channel. The transmitter 124 may receive the notification signal from the processor 125.

The processor 125 may control the receiver 123 and the transmitter 124. The processor 125 may execute the standby mode and the wakeup mode. In detail, the processor 125 may execute the standby mode before receiving the wakeup signal from the receiver 123. When receiving the wakeup signal from the receiver 123, the processor 125 may execute the wakeup mode.

In an embodiment, through frequency switching, the processor 125 may enable the communication for the low frequency band during the standby mode and may enable the communication for the low frequency band and the high frequency band during the wakeup mode. Because only the communication for the low frequency band is enabled in the standby mode, power consumption of the user communication device 120 in the standby mode may be smaller than that in the wakeup mode.

Figure 4:
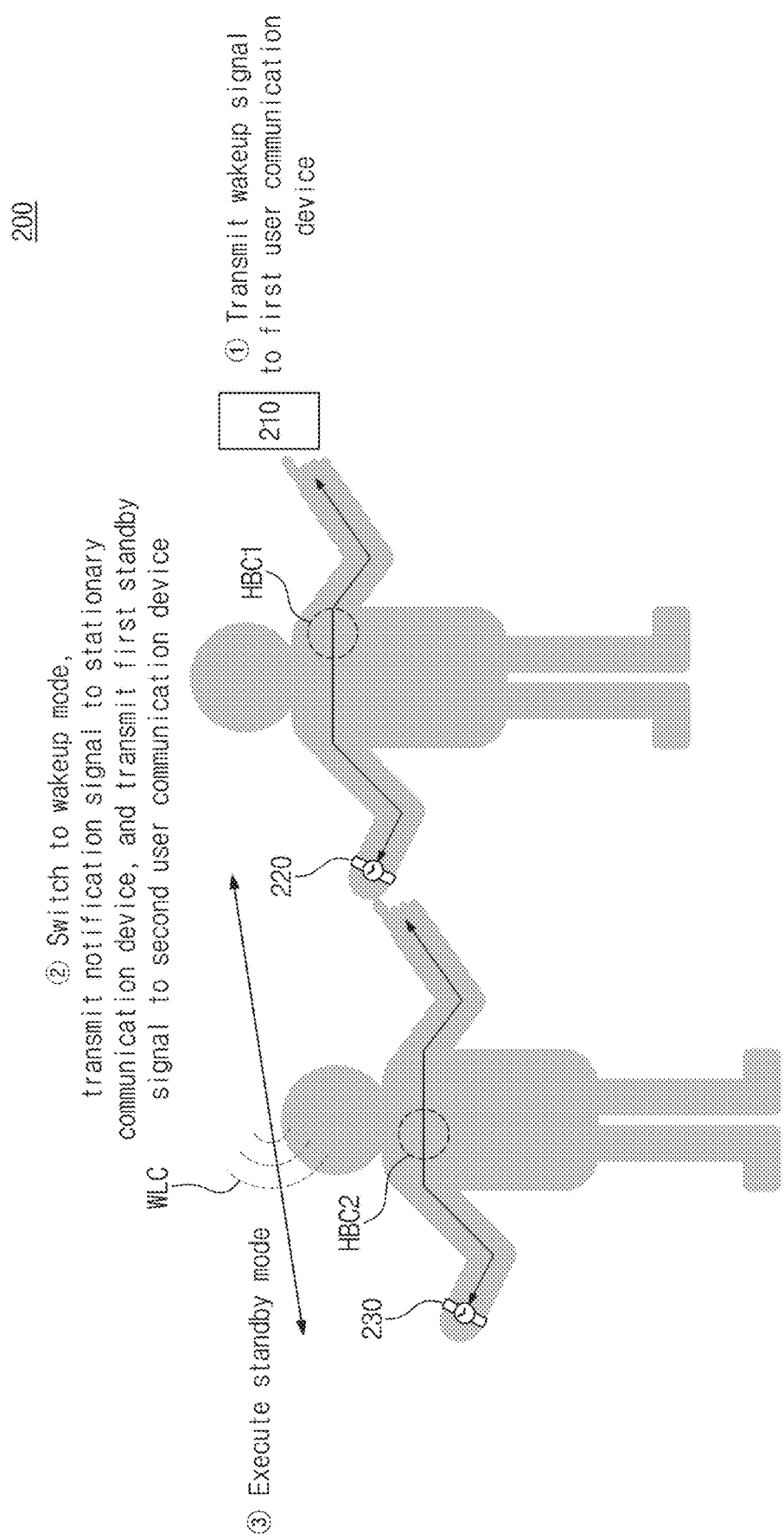
FIG. 4 is a block diagram illustrating a human body communication system according to an embodiment of the present disclosure.

FIG. 4 is a block diagram illustrating a human body communication system according to an embodiment of the present disclosure. Referring to FIG. 4, a human body communication system 200 may include a stationary communication device 210, a first user communication device 220, and a second user communication device 230. The stationary communication device 210 and the first user communication device 220 may correspond to the stationary communication device 110 and the user communication device 120 of FIG. 1, respectively.

The stationary communication device 210 may communicate with the first user communication device 220 over a first human body communication channel HBC1. The first user communication device 220 may communicate with the stationary communication device 210 over the first human body communication channel HBC1. A user of the first user communication device 220 may be a mobile human body communication device of a user that intends to communicate with the stationary communication device 210.

The second user communication device 230 may be a human body communication device that transmits and receives data through the human body communication. The second user communication device 230 may communicate with the first user communication device 220 over a second human body communication channel HBC2.

A user of the second user communication device 230 may be different from the user of the first user communication device 220. The user of the second user communication device 230 may be a mobile human body communication device of a user that does not intend to communicate with the stationary communication device 210. The second user communication device 230 may be a mobile human body communication device of a user that is close to the user of the stationary communication device 210.

The stationary communication device 210 may transmit the wakeup signal to the first user communication device 220 in response to that the contact with the user of the first user communication device 220 is made. The first user communication device 220 may execute the wakeup mode in response to the wakeup signal.

In an embodiment, during the wakeup mode, the first user communication device 220 may transmit the notification signal to the stationary communication device 210. In an embodiment, during the wakeup mode, the first user communication device 220 may transmit a first standby signal to the second user communication device 230. The first standby signal may be a signal requesting the second user communication device 230 to set an operating mode to the standby mode.

In an embodiment, the first user communication device 220 may generate the first standby signal by inserting information, which indicates that the stationary communication device 210 and the first user communication device 220 are under communication, in a header of a signal exchanged over a human body communication network.

In an embodiment, the first user communication device 220 may transmit the first standby signal to the second user communication device 230 over a wireless communication channel WLC. In an embodiment, the first user communication device 220 may transmit the first standby signal to the second user communication device 230 over the second human body communication channel HBC2. The second human body communication channel HBC2 may be a channel that is utilized for the human body communication between the first user communication device 220 and the second user communication device 230. For example, the second human body communication channel HBC2 may be a channel in which a part of the body of the user of the second user communication device 230 is used as a medium.

The second user communication device 230 may receive the first standby signal from the first user communication device 220. The second user communication device 230 may execute the standby mode in response to the first standby signal. In an embodiment, the second user communication device 230 may execute the standby mode during a reference time. The reference time may be a time during which the second user communication device 230 executes the standby mode. In an embodiment, the reference time may be set by the user.

Figure 5:
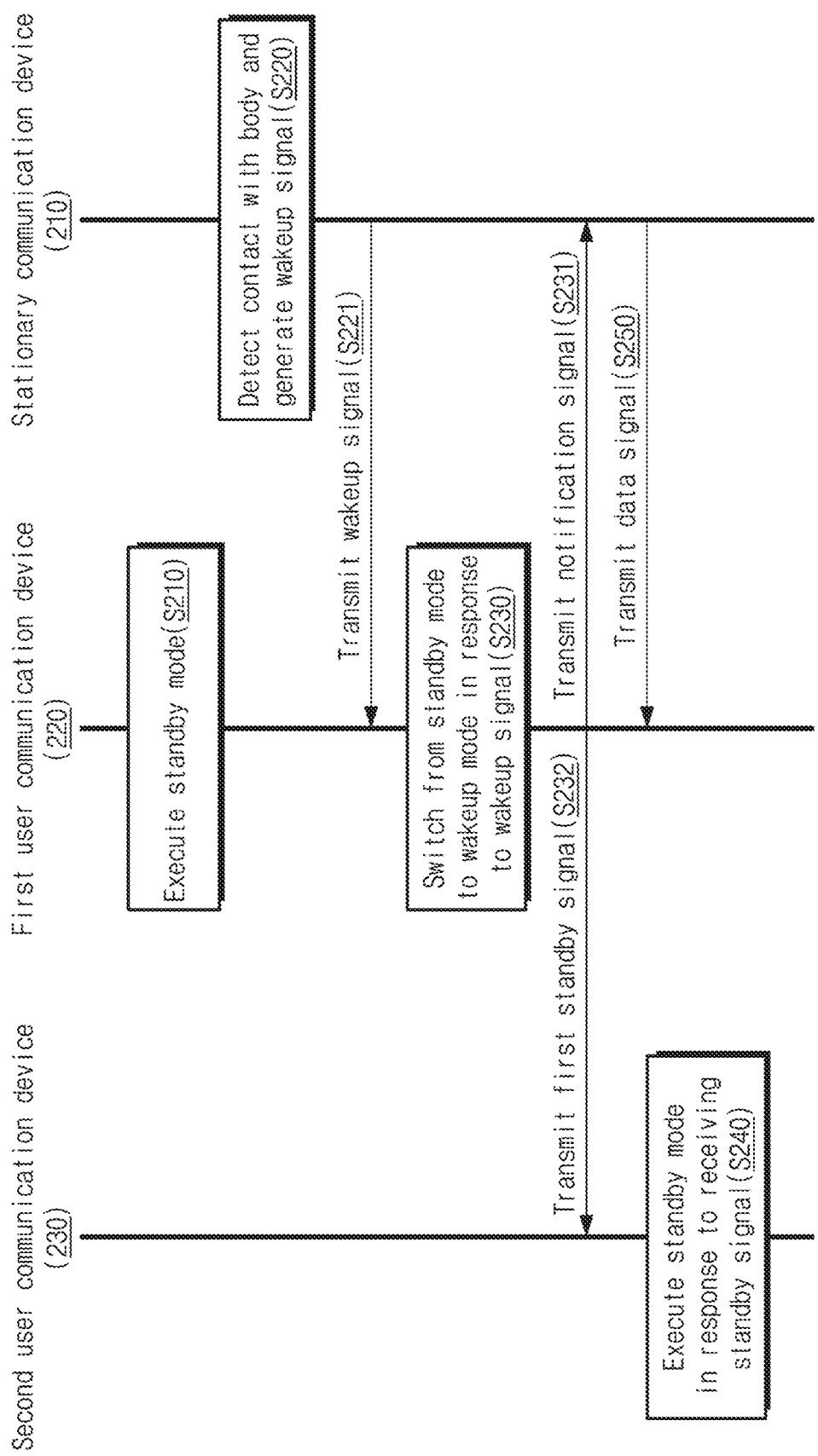
FIG. 5 is a flowchart describing an operating method of a human body communication system of FIG. 4 according to an embodiment of the present disclosure.

FIG. 5 is a flowchart describing an operating method of a human body communication system of FIG. 4 according to an embodiment of the present disclosure. An operating method of the human body communication system 200 of FIG. 4 is illustrated in FIG. 5. The stationary communication device 210, the first user communication device 220, and the second user communication device 230 may correspond to the stationary communication device 210, the first user communication device 220, and the second user communication device 230 of FIG. 4, respectively. Also, operation S210, operation S220, operation S221, and operation S230 may correspond to operation S110, operation S120, operation S121, and operation S130 of FIG. 2, respectively. Thus, additional description will be omitted to avoid redundancy.

In operation S210, the first user communication device 220 may execute the standby mode. In operation S220, the stationary communication device 110 may detect the contact with a body of the user of the first user communication device 220 and may generate the wakeup signal. In operation S221, the stationary communication device 110 may transmit the wakeup signal to the first user communication device 220.

In operation S230, the first user communication device 220 may execute the wakeup mode in response to the wakeup signal. In operation S231, the first user communication device 220 may transmit the notification signal indicating that the wakeup mode is being executed, to the stationary communication device 210.

In operation S232, the first user communication device 220 may transmit the first standby signal to the second user communication device 230. In an embodiment, the first user communication device 220 may transmit the first standby signal to the second user communication device 230 over a second human body communication channel. In an embodiment, the first user communication device 220 may transmit the first standby signal to the second user communication device 230 over a wireless communication channel.

An example in which operation S231 and operation S232 are simultaneously performed is illustrated in FIG. 5, but the present disclosure is not limited thereto. The order of performing operation S231 and operation S232 may be changed depending on embodiments. For example, operation S231 may be performed prior to operation S232, or operation S232 may be performed prior to operation S231.

In operation S240, the second user communication device 230 may execute the standby mode in response to receiving the first standby signal. While the second user communication device 230 executes the standby mode, the second user communication device 230 may receive only a signal having a frequency in the low frequency band.

After the stationary communication device 210 receives the notification signal, in operation S250, the stationary communication device 210 may transmit the data signal to the first user communication device 220. In an embodiment, the data signal may be a signal having a frequency in the high frequency band. As such, the second user communication device 230 that performs the standby mode in which only the communication for the low frequency band is enabled may fail to receive the data signal. That is, only the user of the first user communication device 220 may receive the data signal from the stationary communication device 210.

Figure 6:
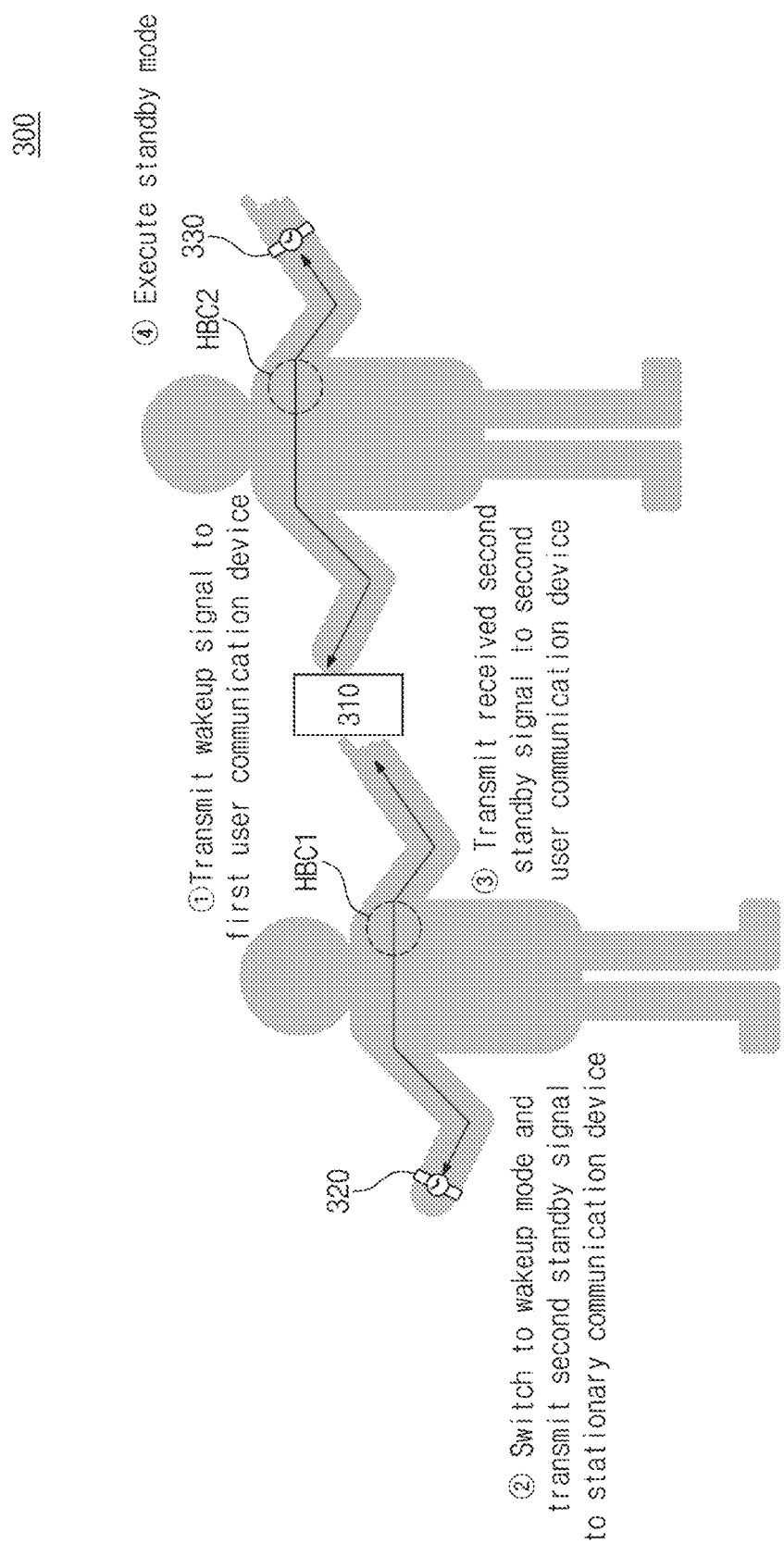
FIG. 6 is a block diagram illustrating a human body communication system according to an embodiment of the present disclosure.

FIG. 6 is a block diagram illustrating a human body communication system according to an embodiment of the present disclosure. Referring to FIG. 6, a human body communication system 300 may include a stationary communication device 310, a first user communication device 320, and a second user communication device 330. The stationary communication device 310, the first user communication device 320, and the second user communication device 330 may correspond to the stationary communication device 210, the first user communication device 220, and the second user communication device 230 of FIG. 4, respectively.

The stationary communication device 310 may communicate with the first user communication device 320 over a first human body communication channel HBC1. The stationary communication device 310 may transmit the wakeup signal to the first user communication device 320 in response to that the contact with the user of the first user communication device 320 is made.

In response to the wakeup signal from the stationary communication device 310, the first user communication device 320 may execute the wakeup mode and may transmit a second standby signal to the stationary communication device 310. The second standby signal may be a signal requesting any other human body communication device, which is capable of communicating with the stationary communication device 310, except for the first user communication device 320 to execute the standby mode.

The stationary communication device 310 may transmit the second standby signal to the second user communication device 330 over a second human body communication channel HBC2 in response to receiving the second standby signal. The second human body communication channel HBC2 may be a channel that is utilized for the human body communication between the stationary communication device 310 and the second user communication device 330. For example, the second human body communication channel HBC2 may be a channel in which a part of the body of the user of the second user communication device 330 is used as a medium.

In an embodiment, the stationary communication device 310 may radiate the second standby signal to a user of the second user communication device 330 through an electrode of the stationary communication device 310. As such, even in the case where the user of the second user communication device 330 does not contact the stationary communication device 310, the stationary communication device 310 may transmit the second standby signal to the second user communication device 330 over the second human body communication channel HBC2.

The second user communication device 330 may execute the standby mode in response to receiving the second standby signal from the stationary communication device 310 over the second human body communication channel HBC2.

Figure 7:
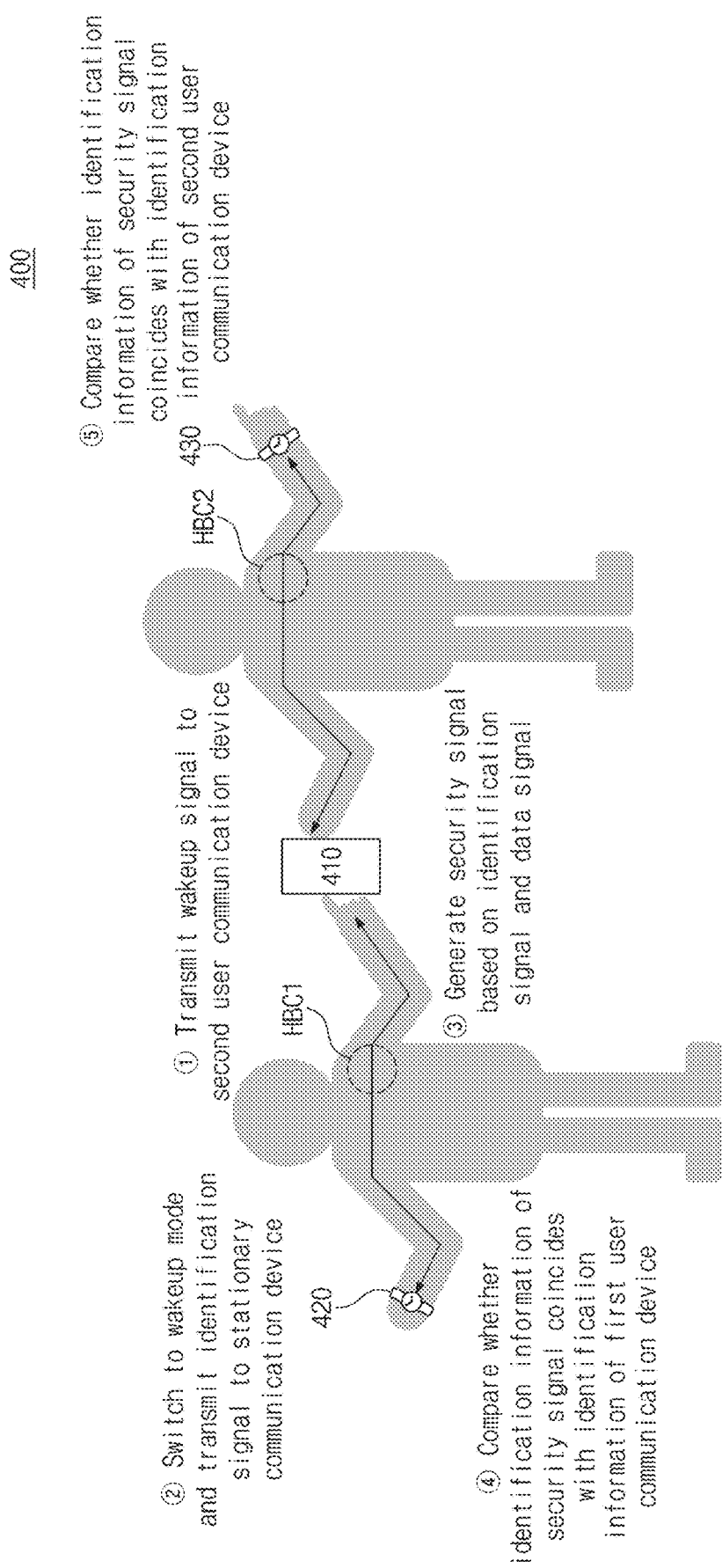
FIG. 7 is a block diagram illustrating a human body communication system according to an embodiment of the present disclosure.

FIG. 7 is a block diagram illustrating a human body communication system according to an embodiment of the present disclosure. Referring to FIG. 7, a human body communication system 400 may include a stationary communication device 410, a first user communication device 420, and a second user communication device 430. The stationary communication device 410, the first user communication device 420, and the second user communication device 430 may correspond to the stationary communication device 210, the first user communication device 220, and the second user communication device 230 of FIG. 4, respectively.

The stationary communication device 410 may communicate with the first user communication device 420 over a first human body communication channel HBC1. The stationary communication device 410 may transmit the wakeup signal to the first user communication device 420 in response to that the contact with the user of the first user communication device 420 is made.

In response to the wakeup signal from the stationary communication device 410, the first user communication device 420 may execute the wakeup mode and may transmit an identification signal to the stationary communication device 410. The identification signal may be a signal corresponding to identification information of the first user communication device 420.

In an embodiment, the first user communication device 420 may transmit the identification signal to the stationary communication device 410 over the first human body communication channel HBC1. In an embodiment, the first user communication device 420 may transmit the identification signal to the stationary communication device 410 over a wireless communication channel.

In response to receiving the identification signal, the stationary communication device 410 may generate a security signal based on the identification signal and the data signal. The security signal may include data corresponding to the data signal and the identification information of the first user communication device 420. The stationary communication device 410 may transmit the security signal to the first user communication device 420 over the first human body communication channel HBC1. The stationary communication device 410 may transmit the security signal to the second user communication device 430 over a second human body communication channel HBC2.

In response to receiving the security signal, the first user communication device 420 may determine whether identification information in the received security signal coincides with the identification information of the first user communication device 420. The first user communication device 420 may process data in the security signal, based on the determination that the identification information in the received security signal coincides with the identification information of the first user communication device 420.

In response to receiving the security signal, the second user communication device 430 may determine whether the identification information in the received security signal coincides with identification information of the second user communication device 430. The second user communication device 430 may discard the security signal, based on the determination that the identification information in the received security signal does not coincide with the identification information of the second user communication device 430.

As such, as the security signal is discarded based on the determination that the identification information in the received security signal does not coincide with the identification information of the second user communication device 430, a communication device that does not intend to communicate may be prevented from processing or storing unnecessary data.

FIG. 8 is a flowchart describing an operating method of a human body communication system of FIG. 7 according to an embodiment of the present disclosure. An operating method of the human body communication system 400 of FIG. 7 is illustrated in FIG. 8. The stationary communication device 410, the first user communication device 420, and the second user communication device 430 may correspond to the stationary communication device 410, the first user communication device 420, and the second user communication device 430 of FIG. 7, respectively. Also, operation S410, operation S420, operation S421, and operation S430 may correspond to operation S110, operation S120, operation S121, and operation S130 of FIG. 2, respectively. Thus, additional description will be omitted to avoid redundancy.

In operation S410, the first user communication device 420 may execute the standby mode. In operation S420, the stationary communication device 410 may detect the contact with a body of the user of the first user communication device 420 and may generate the wakeup signal. In operation S421, the stationary communication device 410 may transmit the wakeup signal to the first user communication device 420.

In operation S430, the first user communication device 420 may execute the wakeup mode in response to the wakeup signal. In operation S431, the first user communication device 420 may transmit the identification signal including identification information of the first user communication device 420 to the stationary communication device 410.

In operation S440, the stationary communication device 410 may generate the security signal based on the identification signal and the data signal.

In operation S451, the first user communication device 420 may determine whether identification information in the security signal coincides with the identification information of the first user communication device 420.

In operation S452, the first user communication device 420 may process the received security signal in response to the determination that the identification information in the security signal coincides with the identification information of the first user communication device 420. For example, the first user communication device 420 may recover the data signal in the security signal.

In operation S450, the stationary communication device 410 may transmit the security signal to the first user communication device 420 over a first human body communication channel. In operation S460, the stationary communication device 410 may transmit the security signal to the second user communication device 430 over a second human body communication channel.

An example in which operation S450 and operation S460 are simultaneously performed is illustrated in FIG. 5, but the present disclosure is not limited thereto. The order of performing operation S450 and operation S460 may be changed depending on embodiments. For example, operation S450 may be performed prior to operation S460, or operation S460 may be performed prior to operation S450.

In operation S461, the second user communication device 430 may determine whether the identification information in the security signal coincides with the identification information of the second user communication device 430.

In operation S462, the second user communication device 430 may discard the received security signal in response to the determination that the identification information in the security signal does not coincide with the identification information of the second user communication device 430.

According to an embodiment of the present disclosure, a user communication device executing a standby mode, an operating method thereof, and a human body communication system including the same are provided.

Also, a user communication device that reduces power consumption and improves security by executing the standby mode, an operating method thereof, and a human body communication system including the same are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a user communication device, the method comprising:
receiving a wakeup signal from a stationary communication device over a first human body communication channel, wherein the wakeup signal has a frequency in a low frequency band;
switching from a standby mode to a wakeup mode in response to the wakeup signal; and
receiving a data signal from the stationary communication device over the first human body communication channel during the wakeup mode,
wherein the first human body communication channel is provided by a body of a user of the user communication device;
transmitting a standby signal requesting another user communication device to set an operating mode of the other user communication device to the standby mode, during the wakeup mode;
wherein the transmitting the standby signal requesting the other user communication device to set the operating mode of the other user communication device to the standby mode, during the wakeup mode includes:
transmitting the standby signal to the other user communication device over a second human body communication channel during the wakeup mode, and
wherein the second human body communication channel is provided by a body of a user of the other user communication device.

2. The method of claim 1, wherein the receiving of the data signal from the stationary communication device over the first human body communication channel during the wakeup mode includes:
transmitting, at the user communication device, a notification signal to the stationary communication device indicating that the user communication device switches to the wakeup mode, during the wakeup mode; and
receiving the data signal from the stationary communication device over the first human body communication channel after transmitting the notification signal.

3. The method of claim 1, wherein the transmitting the standby signal requesting the another user communication device to set the operating mode of the another user communication device to the standby mode, during the wakeup mode includes:
transmitting the standby signal to the another user communication device over a wireless communication channel during the wakeup mode.

4. The method of claim 1, wherein the user communication device and the another user communication device are mobile human body communication devices, and
wherein the stationary communication device is a stationary human body communication device.

5. The method of claim 1, further comprising:
switching from the wakeup mode to the standby mode after processing the data signal.

6. The method of claim 1, wherein the data signal has a frequency in a high frequency band higher than the low frequency band.

7. The method of claim 1, wherein the wakeup mode enables both communication for the low frequency band corresponding to the wakeup signal and communication for a high frequency band corresponding to the data signal.

8. A method of operating of a human body communication system which includes a user communication device, another user communication device and a stationary communication device communicating with each other over a first human body communication channel, the method comprising:
transmitting, by the stationary communication device, a wakeup signal to the user communication device over the first human body communication channel, wherein the wakeup signal has a frequency in a low frequency band;
switching, by the user communication device, from a standby mode to a wakeup mode in response to the wakeup signal; and
transmitting, by the stationary communication device, a data signal to the user communication device over the first human body communication channel during the wakeup mode of the user communication device,
wherein the first human body communication channel is provided by a body of a user of the user communication device;
transmitting, by the user communication device, a standby signal requesting the other user communication device to set an operating mode of the other user communication device to the standby mode, during the wakeup mode;
wherein the transmitting the standby signal requesting the other user communication device to set the operating mode of the other user communication device to the standby mode, during the wakeup mode includes:
transmitting the standby signal to the other user communication device over a second human body communication channel during the wakeup mode, and
wherein the second human body communication channel is provided by a body of a user of the other user communication device.

9. The method of claim 8, further comprising:
executing, by the other user communication device, the standby mode in response to the standby signal.

10. The method of claim 8, wherein the switching from the standby mode to the wakeup mode in response to the wakeup signal by the user communication device includes:
transmitting, by the user communication device, an identification signal corresponding to identification information of the user communication device to the stationary communication device, and
wherein the transmitting of the data signal to the user communication device over the first human body communication channel during the wakeup mode of the user communication device by the stationary communication device includes:
generating, by the stationary communication device, a security signal including the identification information and data corresponding to the data signal; and
transmitting, by the stationary communication device, the security signal to the user communication device over the first human body communication channel.

11. The method of claim 10, further comprising:
determining, by the user communication device, whether identification information of the security signal coincides with the identification information of the user communication device; and
processing, by the user communication device, the security signal, when it is determined that the identification information of the security signal coincides with the identification information of the user communication device.

12. The method of claim 10,
wherein the transmitting of the security signal to the user communication device over the first human body communication channel by the stationary communication device includes:
transmitting, by the stationary communication device, the security signal to the another user communication device over the second human body communication channel;
determining, by the other user communication device, whether identification information of the security signal coincides with identification information of the other user communication device; and
discarding the security signal based on a determination that the identification information of the security signal does not coincide with the identification information of the other user communication device.

13. The method of claim 10, wherein the transmitting of the identification signal to the stationary communication device by the user communication device includes:
transmitting, by the user communication device, the identification signal to the stationary communication device over the first human body communication channel or a wireless communication channel.

14. A user communication device comprising:
a first electrode and a second electrode configured to contact a user;
a receiver configured to receive a wakeup signal from a stationary communication device over a human body communication channel, based on that the first electrode contacts contacting the user;
a processor configured to switch an operating mode from a standby mode to a wakeup mode based on the wakeup signal and to generate a standby signal indicating the standby mode; and
a transmitter configured to transmit the standby signal to the stationary communication device over the human body communication channel, based on the second electrode contacting the user, wherein the processor enables communication for a low frequency band during the standby mode and enables the communication for the low frequency band and communication for a high frequency band during the wakeup mode, wherein the human body communication channel is provided by a body of the user;

wherein the transmitter is further configured to transmit a standby signal requesting another user communication device to set an operating mode of the other user communication device to the standby mode, during the wakeup mode;

wherein the transmitting the standby signal requesting the other user communication device to set the operating mode of the other user communication device to the standby mode, during the wakeup mode includes:

transmitting the standby signal to the other user communication device over a second human body communication channel during the wakeup mode, and wherein the second human body communication channel is provided by a body of another user of the other user communication device.

* * * * *